United States Patent [19]

Elliott et al.

[11] Patent Number: 5,029,269
[45] Date of Patent: Jul. 2, 1991

[54] DELAYED POWER SUPPLY OVERVOLTAGE SHUTDOWN APPARATUS

[75] Inventors: Brent Elliott; Ed Johnson, both of Plano; Lee Marusik, Allen, all of Tex.

[73] Assignee: Rockwell International Corporation, El Segundo, Calif.

[21] Appl. No.: 509,108

[22] Filed: Apr. 12, 1990

[51] Int. Cl.⁵ .................. H02H 7/12; H02M 3/335
[52] U.S. Cl. .................. 363/21; 323/284; 361/18; 361/91; 363/56
[58] Field of Search .............. 323/285, 284; 363/21, 363/56; 361/18, 83, 91

[56] References Cited

U.S. PATENT DOCUMENTS

| | | |
|---|---|---|
| 3,816,809 | 6/1974 | Kuster . |
| 4,405,964 | 9/1983 | Woods et al. ............ 361/18 |
| 4,464,709 | 8/1984 | Barter ...................... 363/56 |
| 4,739,462 | 4/1988 | Farnsworth et al. ......... 363/21 |

FOREIGN PATENT DOCUMENTS 66561 4/1986 Japan .
70265 3/1990 Japan .

Primary Examiner—William H. Beha, Jr.
Attorney, Agent, or Firm—Bruce C. Lutz; V. Lawrence Sewell; H. Fredrick Hamann

[57] ABSTRACT

A pulse-width modulated DC-DC power supply is illustrated with overvoltage protection which upon initial detection momentarily shuts down the pulse-width modulating portion of the control loop for a given cycle. If the overvoltage condition persists for more than a prescribed number of cycles or amount of time, the power supply is shut down permanently. The delay between momentary and permanent shut down being used to allow system operation to be maintained with minimal damage (voltage induced load stress) where large voltage transients may be temporarily introduced into the system.

9 Claims, 2 Drawing Sheets

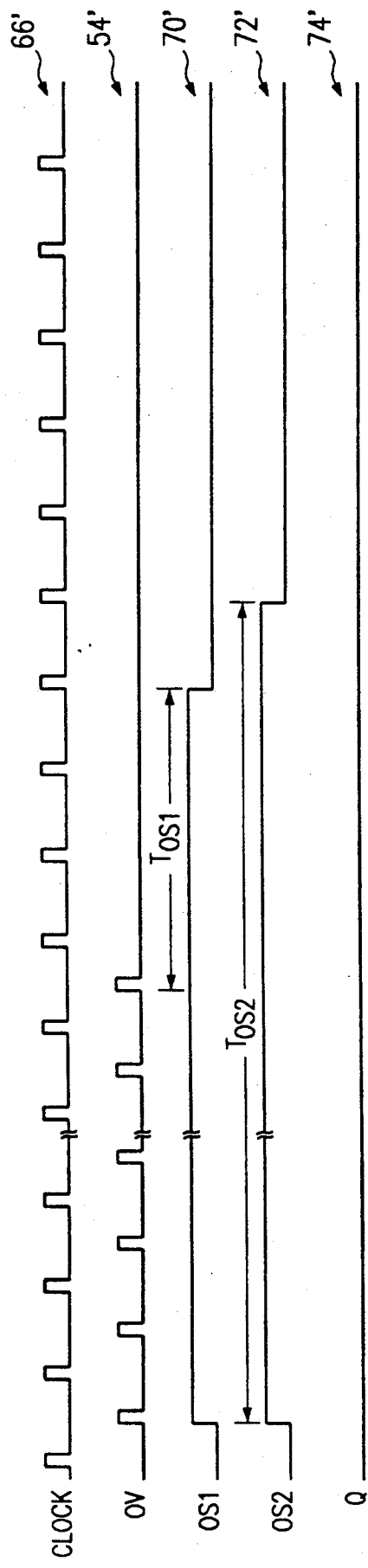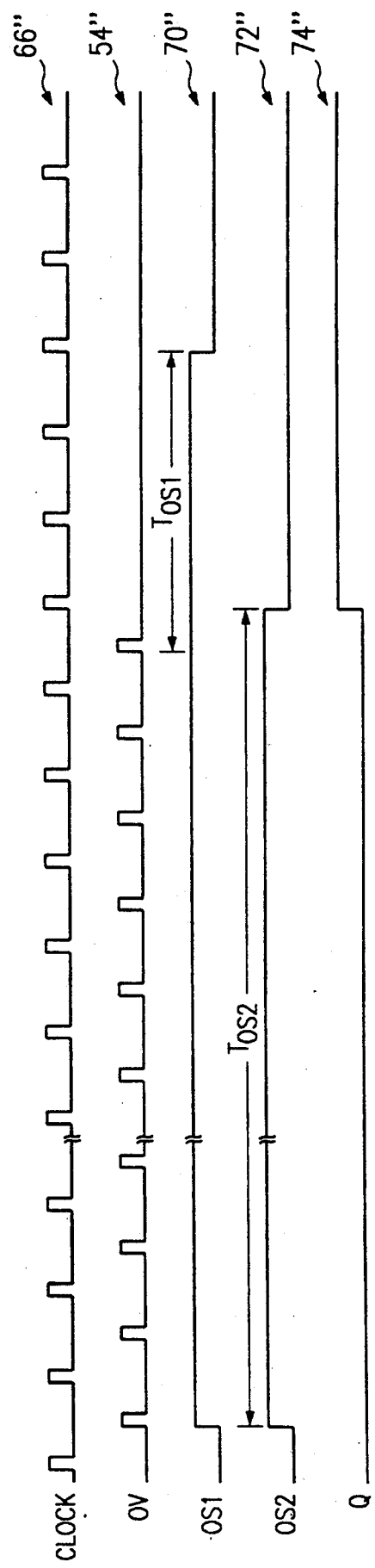

DELAYED POWER SUPPLY OVERVOLTAGE SHUTDOWN APPARATUS

THE INVENTION

The present invention pertains generally to electronics and more specifically to power supplies. Even more specifically, the present invention pertains to a method of controlling a power supply for temporary overvoltage conditions, but shutting it down for permanent overvoltage conditions.

BACKGROUND

This invention relates to overvoltage protection for power supplies and illustrates its application specifically to overvoltage protection with a switched-mode power supply using current-mode control to provide output voltage regulation.

Current-mode control of switched-mode power supplies has been used for many years and has been frequently discussed in the literature available to one skilled in the art. Current mode control uses an inner control loop to control the peak inductor current in accordance with an error signal from an error amplifier. As the error signal changes, the peak switching current follows proportionally to deliver more or less current to the load as required to maintain output voltage regulation. Failures in the error amplifier section of the voltage control unit, its reference voltage, the flip-flop, or the comparator can cause the power supply's output voltage to exceed its prescribed or normal value. Some form of power supply overvoltage fault protection is generally required to protect the load against voltage overstress. One prior art approach has been to place a zener diode across the power supply's output to clamp the output voltage. Due to the limited power handling capabilities of practical zener diodes, the zener will generally fail shorted when subjected to a sustained power supply overvoltage fault condition. The load is thereby protected, provided that the power supply is either current limited or fused. Unfortunately, there is no load protection in the event that the zener fails open-circuited. Thus, sophisticated power supplies do not use zener diodes to provide overvoltage fault protection.

The overvoltage protection for some of the more sophisticated power supplies of the prior art has been to completely disable the power supply when an excessive output voltage has been sensed. This may be either latching or non-latching. Either of these prior art approaches have deficiencies, since the prior art latching approach may shut down a power supply in the face of temporary overvoltage conditions such as voltage surges, whereas the non-latching approach allows the overvoltage condition to be continued on a cyclic basis until manual intervention. Both of these approaches have used elements of the feedback control loop, where a failure may be the cause of the overvoltage condition, as part of the overvoltage protection circuit.

The present invention solves the above listed deficiencies by cyclically, but momentarily, shutting down the power supply upon detection of an overvoltage and only shutting the power supply down permanently if the overvoltage condition is maintained for more than a predetermined time.

It is thus an object of the present invention to provide an improved overvoltage protection scheme.

Other objects and advantages of the present invention will be apparent from reading of the specification and appended claims in conjunction with the drawings wherein FIG. 1 is a schematic of a prior art approach to the overvoltage problem;

FIG. 2 illustrates the application of the present inventive concept to a pulse-width modulated power supply;

FIG. 3 provides waveforms for use in explaining the operation of FIG. 2 where the overvoltage condition does not exceed the predetermined time limit; and FIG. 4 illustrates waveforms used in explaining the operation of FIG. 2 where the overvoltage condition does exceed the predetermined time limit.

DETAILED DESCRIPTION

Figure 1:
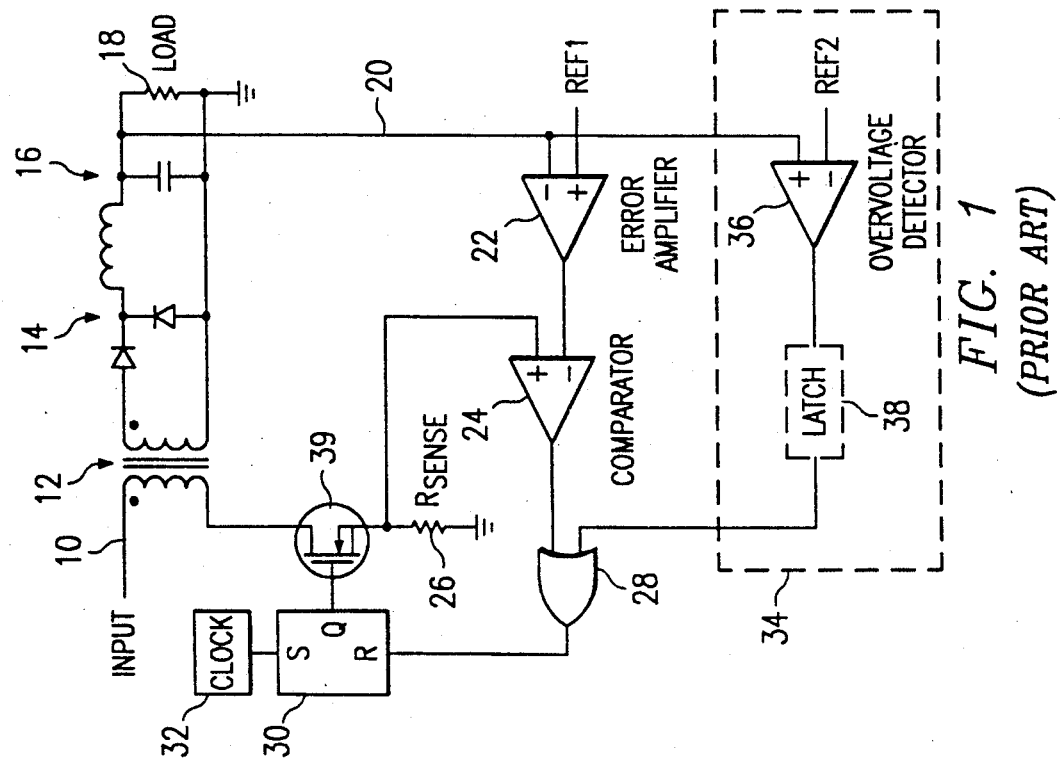

In FIG. 1 an input lead 10 provides DC power to a transformer 12 which provides an output to a rectifier circuit 14 which in turn is connected to a filter circuit 16. A load 18 is shown connected to the output of the power supply which in essence is found across the output of filter 16. A lead 20 provides an indication of the output voltage to an error amplifier 22 and on to a comparator 24, which compares the voltage across a current sense resistor 26 with the output from error amplifier 22 and supplies an output to an OR logic gate 28. Logic gate 28 supplies signals to a flip-flop 30 which is cyclically operated via a clock 32. The lead 20 is also supplied to a dash line block 34 containing an overvoltage detector 36 and a dash line latch 38. The output of latch 38 is also supplied to logical OR gate 28. The dash line representation is used to show optional circuitry.

Figure 2:
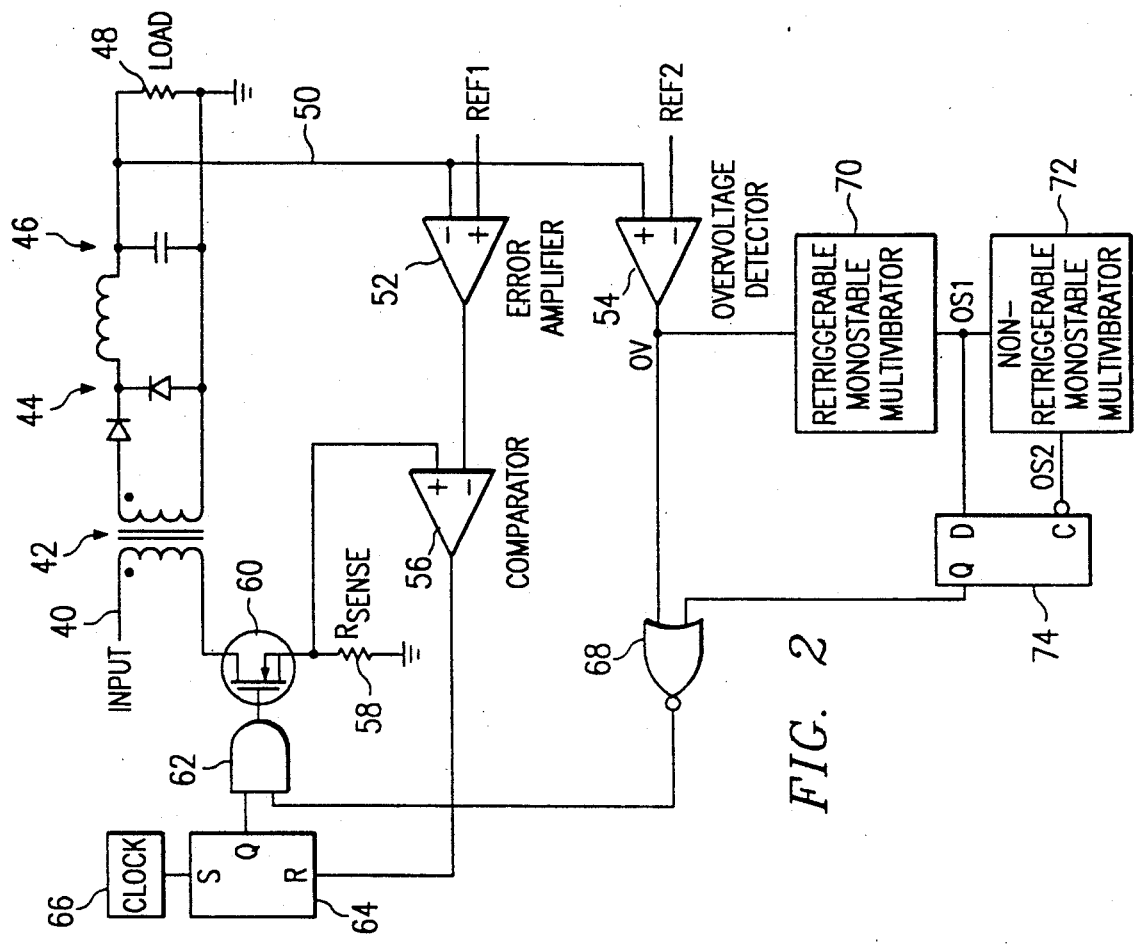

In FIG. 2 an input 40 supplies DC power to the primary of a transformer 42 whose secondary in turn is connected to a set of rectifiers 44, a filter 46 and a load 48 in a manner similar to that of FIG. 1. An output lead 50 supplies signals indicative of the output voltage to an error amplifier 52 and to an overvoltage detector 54. A comparator 56 receives signals from the error amplifier 52 and a feedback signal from a current sense resistor 58. A power switch or switching transistor 60 is connected between the primary of transformer 42 and the current sense resistor 58. The output of comparator 56 is supplied to a flip-flop 64 which is cyclically controlled by a clock 66. The parts described thus far are similar to those of FIG. 1. The output of the overvoltage detector 54 in FIG. 2 is to a logical NOR gate 68 and to a retriggerable monostable multivibrator 70. An output of retriggerable monostable multivibrator 70 is supplied to a non-retriggerable monostable multivibrator 72, as well as to a D input of a flip-flop 74. The non-retriggerable monostable multivibrator 72 supplies an output signal which is inverted and supplied to a clock input of flip-flop 74. A Q output of flip-flop 74 is supplied to a second input of logical NOR gate 68. The inverted output of NOR gate 68 is supplied to an AND gate 62 which also receives an input from the Q output of flip-flop 64 and supplies a switching signal to the switching transistor 60.

FIG. 3 contains various waveforms with designators and primes corresponding to FIG. 2. In other words, the clock signal is given designator 66'. The next waveform is labeled 54' and is indicative of the output from overvoltage detector 54. The third signal of FIG. 3 is labeled 70' and is indicative of the output signal from retriggerable monostable multivibrator 70. The fourth signal is designated as 72' and is indicative of the signal output from block 72. The last signal of FIG. 3 is designated 74' and is indicative of the Q output from flip-flop 74. The waveforms of FIG. 4 are given the same designations as in FIG. 3 except that each one has been given a double prime (") for differentiation.

OPERATION

The output voltage regulation of a switched mode power supply such as shown in the prior art of FIG. 1, is maintained by constant frequency current mode control of the duty cycle of the power switch such as transistor 39. At the beginning of a cycle, a positive going clock signal from clock 32 causes the flip-flop 30 to switch "high" thereby turning power switch 39 ON. This applies voltage to the secondary of transformer 12, causing the transformer current as well as the voltage across current sense resistor 26 to increase at a linear rate. This secondary voltage is rectified by rectifiers 14 and filtered by filter 16 to produce a voltage across load 18. Error amplifier 22 generates an error signal proportional to the difference between the voltage across load 18 and the internal reference REF1. When the magnitude of the voltage across resistor 26 exceeds the error signal, comparator 24 senses a change in comparative voltage inputs and provides an output signal through the logic gate 28 to flip-flop 30 to reset it, and the cycle repeats with the next positive going clock from clock 32. It can be thus seen that the PWM signal from comparator 24 controls the duty cycle of the switch 39 and, as a result, changes the amount of energy applied to the transformer 12 necessary to maintain a constant voltage output.

As previously mentioned, the first prior art attempts at overvoltage protection were to utilize a zener diode in parallel with load 18 to clamp the voltage. This approach is not specifically shown but will be realized by those skilled in the art as having no load protection in the event of the zener diode failing open circuited. Further, the high currents which must be absorbed by a zener diode in temporary high voltage conditions can easily cause such a zener diode to fail, either in the shorted or the open condition.

In view of the shortcomings of zener diodes, the non-latching overvoltage detection apparatus of FIG. 1, as illustrated within block 34, includes overvoltage detector 36 without latch 38. When the current mode control loop fails to properly limit the duty cycle, the output voltage starts to increase. If the output voltage exceeds a reference voltage such as REF2 supplied to overvoltage detector 36, the output of overvoltage detector 36 switches high to reset flip-flop 30, which turns power switch 39 OFF, causing the output voltage across load 18 to decay. The flip-flop 30 is held in reset keeping the power switch 39 turned OFF until the end of the cycle. When the output voltage across load 18 decays below the reference of the overvoltage detector 36, the output of the overvoltage detector switches low. The cycle repeats with the next positive going clock from clock 32. The overvoltage circuit is activated each cycle for as long as the control loop fails to properly limit the duty cycle.

Under the conditions outlined in the above paragraph, where there effectively is a short across dash line latch 38, the power supply operates in a voltage limiting mode controlled by the non-latching shutdown pulses generated by the overvoltage detector 36. However, since the REF2 supplied to detector 36 is typically significantly greater than normal operating voltage, this higher voltage may severely stress the load 18 if the fault condition persists indefinitely.

In view of the stress to the load, the circuit of FIG. 1 has been implemented in the prior art including latch 38 to minimize load stress. Upon detection of an output overvoltage condition, the power supply is shut OFF until the latch is reset. This resetting generally takes place by momentarily removing input power supplied on lead 10. The disadvantage of this technique is that a large line or load transient may cause an inadvertent latched shutdown of the power supply particularly if the overvoltage detector is set to trip close to the normal output voltage.

If one were to attempt to reduce inappropriate latching by filtering the input signal to the overvoltage detector thus improving the noise immunity to prevent nuisance trips, there is likely to be too much voltage stress of the load due to the output voltage overshoot. It is thus the present inventor's opinion that an overvoltage detector circuit must generally have a fast response to provide adequate load protection.

Some of the prior art overvoltage protection deficiencies, as illustrated in FIG. 1, are either that the unit will trip for transients if the latch 38 is included, or if it is deleted, the load may be overstressed if conditions causing the overvoltage continue for a protracted period. If the overvoltage condition detected by detector 36 of FIG. 1 was caused by a faulty flip-flop such as 30 of FIG. 1 which fails to reset, then none of the techniques outlined above will provide absolute overvoltage protection. Thus, any prior art approach combining the overvoltage detection with any portion of the normal control loop comprises a less than optimal overvoltage protection scheme.

The present invention illustrated in FIG. 2 is an attempt to avoid these prior art problems while maintaining a fast response. As will be noted, the upper two-thirds of FIG. 2 is nearly identical to that of FIG. 1 without latch 38. FIG. 2, however, provides fast response but temporary non-latching shutdown combined with delayed latching shutdown and gates the power switch directly, thus, completely bypassing any failed components in the control loop which may have caused the overvoltage condition in the first place. When an overvoltage condition is initially detected, the power supply operates in a voltage limiting mode controlled by the non-latching shutdown pulses generated by the overvoltage detector 54 and supplied through the AND gate 62 to the switch 60. The first non-latching shutdown pulse triggers the retriggerable multivibrator 70, which in turn triggers the non-retriggerable multivibrator 72. The outputs of these two blocks are shown in FIGS. 3 and 4 on waveforms 70 and 72 with single or double primes (' or ") as appropriate. The output of block 70 remains high as long as the non-latching shutdown pulses are present and times out after the overvoltage condition is no longer detected. This timeout is shown as $T_{OS1}$ and occurs much sooner in FIG. 3 than it does in FIG. 4. In FIG. 3 the output of overvoltage detector 54 only lasts a time less than the preset time $T_{OS2}$ of waveform 72'. When it falls to produce the inverted clock input to D flip-flop 74, the input from multivibrator 70 is no longer high and thus, there is no Q output generated. Thus, the system continues to be controlled by the error amplifier 52 once the overvoltage condition ceases and the error amplifier is again in control. However, if the retriggerable multivibrator 70 has not timed out, such as shown in FIG. 4, at the time of $T_{OS2}$ ending, the clock input from multivibrator 72 will cause D flip-flop 74 to transfer the logical 1 on the D input from block 70 to its Q output and thus, produce a logical output to maintain the power switch 60 in an OFF condition or, in other words, causing a latched power supply shutdown.

As will be apparent, this delayed latching shutdown mechanism prevents nuisance trips due to large line or load transients without sacrificing proper protection against voltage overstress of the load 48. A momentary output voltage overshoot is clamped to an acceptable level by the non-latching loop comprising overvoltage detector 54, wherein its outputs are directed through the gates 68 and 62 to the switch 60. Thus, any momentary output voltage overshoot is clamped to an acceptable level by a non-latching loop with fast response. A long term overvoltage condition is clamped around the same level using the same overvoltage detection scheme until the latching action of the additional circuitry of FIG. 2 causes the power supply to turn itself OFF.

This protection scheme enhances system reliability by insuring that the load voltage is limited to an acceptable level without the risk of latched power supply shutdown due to transients and corrects prior art deficiencies where failures in the primary control loop used in common with the overvoltage protection scheme were the cause of the overvoltage condition in the first place.

Although the present inventive concept has been described and illustrated as applied to a switched mode power supply, the concept can be used with any type of power supply with suitable circuit modifications to provide the cyclic checking of output voltage and latched shutdown so as to minimize any overstress conditions.

In view of the above, we wish to be limited not by the specific embodiment illustrated but only by the scope of the appended claims wherein we claim:

1. Overvoltage protection apparatus comprising, in combination:
    DC—DC switched-mode power supply means, including a control feedback loop, for controlling the duty cycle of a power switch to maintain output voltage regulation;
    overvoltage detection means, connected in parallel with said control feedback loop, for instantaneously switching the power switch to an OFF condition upon detection of the output voltage exceeding a predetermined value; and
    time delayed means, connected to said overvoltage detection means, for latching said power switch to an OFF condition if the predetermined value of output voltage is detected for more than a predetermined time.

2. The method of protecting a load from being subjected to a continuous overvoltage condition while not overly reacting to momentary voltage surges at the output of a cyclically ON/OFF switched PWM (pulse-width modulated) DC—DC converter comprising the steps of:
    monitoring the output voltage of a PWM converter;
    cyclically turning the PWM portion of the converter to an OFF condition immediately upon detection of an overvoltage condition;
    timing the duration of the overvoltage condition; and
    latching the PWM converter to an OFF condition if the duration of the overvoltage condition exceeds a predetermined time.

3. Apparatus for protecting a load from being subjected to a continuously occurring overvoltage condition while not overly reacting to momentary voltage surges at the output of a switched PWM (pulse-width modulated) DC—DC converter comprising, in combination:
    PWM converter including a cyclically operating ON/OFF switch used as part of the output voltage control;
    first means, connected to said converter, for monitoring the output voltage;
    second means, connected to said first means, for cyclically turning the switch to an OFF condition immediately upon detection of an overvoltage condition;
    third means for timing the duration of the overvoltage condition; and
    fourth means, connected to said second and third means, for latching the switch to an OFF condition if the duration of the overvoltage condition exceeds a predetermined time.

4. Apparatus as claimed in claim 3 wherein said fourth means comprises a retriggerable monostable multivibrator, a non-retriggerable monostable multivibrator, and a D flip-flop.

5. Power supply overvoltage protection apparatus comprising, in combination:
    power supply means, including a control feedback loop driving a variable duration switch, for controlling the duty cycle of a power switch to maintain output voltage regulation;
    overvoltage detection means, connected in parallel with said control feedback loop, for instantaneously altering the ON switching time duration on a cycle-by-cycle basis upon detection of the output voltage exceeding a predetermined value; and
    time delayed means, connected to said overvoltage detection means, for latching said power switch to an OFF condition if the predetermined value of output voltage is detected for more than a predetermined time.

6. Overvoltage protection apparatus for use with a DC—DC switched mode power supply including a current-mode control feedback loop driving a variable duration switch which operates to control switching duty cycle comprising, in combination:
    overvoltage detection means, connected to a current-mode control feedback loop of a DC—DC switched mode power supply, for instantaneously altering the power supply switching time duration on a cycle-by-cycle basis upon detection of the output voltage exceeding a predetermined value; and
    time delayed latch means, connected to said overvoltage detection means, for reducing the output voltage of the power supply to zero if the predetermined value of output voltage is detected for more than a predetermined time.

7. Overvoltage protection apparatus for use with a power supply including control feedback which operates to control a switch to maintain output voltage regulation comprising, in combination:
    overvoltage detection means, connected to a control feedback loop of a power supply, for momentarily shutting down the power supply on a cyclical basis upon detection of the output voltage exceeding a predetermined value; and
    latch means, connected to said overvoltage detection means, for permanently reducing the output voltage of the power supply to zero if the predetermined value of output voltage is detected for more than a predetermined time.

8. Power supply overvoltage protection apparatus comprising, in combination:

power supply means, including a control feedback loop, for controlling the output voltage thereof;

overvoltage detection means, connected in parallel with said control feedback loop, for momentarily, but cyclically, shutting down the power supply upon detection of the output voltage exceeding a predetermined value; and latch means, connected to said overvoltage detection means, for shutting down the power supply if the predetermined value of output voltage is detected for more than a predetermined time.

9. Power supply overvoltage protection apparatus comprising, in combination:

output voltage controlled power supply means, including controlled voltage output means and a control signal input means, for providing stable output voltage levels under normal conditions;

overvoltage detection means, connected to said controlled voltage output means of said power supply means and to said control signal input means thereof; for momentarily, but cyclically, shutting down the power supply means upon detection of the output voltage exceeding a predetermined value; and latch means, connected to said overvoltage detection means, for shutting down the power supply if the predetermined value of output voltage is detected for more than a predetermined time.

* * * * *